United States Patent [19]

Mullen

[11] Patent Number: 4,878,637
[45] Date of Patent: Nov. 7, 1989

[54] MODULAR SPACE STATION

[76] Inventor: Charles F. Mullen, 204 Yacht Club La., Seabrook, Tex. 77586

[21] Appl. No.: 194,042

[22] Filed: May 13, 1988

Related U.S. Application Data

[63] Continuation-in-part of Ser. No. 900,094, Aug. 25, 1986, Pat. No. 4,744,533.

[51] Int. Cl.4 .............................................. B64G 1/10
[52] U.S. Cl. .................................................... 244/159
[58] Field of Search ................... 244/158 R, 159, 161; 52/79.1, 79.5, 79.7, 79.12

[56] References Cited

U.S. PATENT DOCUMENTS

| | | | |
|---|---|---|---|
| 3,737,117 | 6/1973 | Belew | 244/161 |
| 3,910,533 | 10/1975 | Cheatham et al. | 244/161 |
| 4,728,060 | 3/1988 | Cohen | 244/158 R |
| 4,744,533 | 5/1988 | Mullen | 244/159 |

OTHER PUBLICATIONS

"Boeing Space Station" brochure.

Primary Examiner—Joseph F. Peters, Jr.
Assistant Examiner—Rodney Corl
Attorney, Agent, or Firm—Kenneth A. Roddy

[57] ABSTRACT

A modular space station having a central enclosed area is erected in earth orbit from modules transported by a reusable space shuttle or an expendable rocket. The modules have panels which extend outwardly to join the modules together in spaced relation to form a complete enclosure about a common interior volume with the panels and modules forming the walls of the common enclosure. When two modules are so joined a single space station unit is created with a common central area having approximately the same volume as the modules. The single space station units serve as building blocks which may be joined in various configurations to create increasingly larger space station units having a plurality of enclosed central areas. The modules and central areas created thereby serve as usable space for various purposes and capable of being equipped for life support. Passageways allow occupant communication between the modules and the central enclosure. Adapter modules may be secured to the modules and various other devices such as docking ports for docking space craft to the station and thrust generating or communication devices.

36 Claims, 3 Drawing Sheets

MODULAR SPACE STATION

CROSS REFERENCE TO RELATED APPLICATION

This application is a continuation-in-part of copending application Ser. No. 900,094, now U.S. Pat. No. 4,744,533.

BACKGROUND OF THE INVENTION

1. Field of the Invention

This invention relates generally to modular space stations, and more particularly to a modular space station structure erected in earth orbit from modules transported in the payload bay of a space shuttle or by expendable rocket and having panels extendible therefrom which are joined to form a central enclosed area between the modules.

2. Brief Description of the Prior Art

Toroidal space stations have been designed that could be lifted into earth orbit in one shot, and then deployed out to their operational form. The more recent Skylab is an example of a one-shot space station that was put into earth orbit. Severe size and weight restrictions of such one-shot space stations limit the effective working life of the space station and limit the exhaustible staples required to support life for its inhabitants. The size and weight restrictions also limit other necessities such as providing artificial gravity to overcome the effect of weightlessness over extended periods of time.

Very large self-sufficient space stations have also been proposed which would support many forms of terrestrial life. Most self-supporting space stations would be so large as to make it impractical to erect them piecemeal on earth and lift them piece by piece to be assembled in earth orbit. It has been suggested that they may have to be fabricated in earth orbit from raw materials carried on a space shuttle or from earth's moon.

The large wheel-like structures are a result of the concept that artificial gravity would be necessary for longterm habitation. The current state of the art has replaced the wheel designs with living and working modules connected together around a hub with outwardly extending feelers, collectors and manipulators which resemble a robotic spider.

State of the art "clustered module" concepts have been proposed by the National Aeronautics and Space Administration (NASA) and from NASA contractors such as McDonnell Douglas Astronautics Co., TRW Space and Technology Group, Rockwell International, and Boeing Aerospace Company.

The above mentioned "clustered modules" are aggregations or conglomerations which feature a central open frame structure having various cylindrical modules spaced thereabout and connected together by a network of pressurized tubes. The modules are interconnected by joining them together end to end or joining their ends together with pressurized tubes. Later shuttle trips would add modules or appendages to that basic structure. The modules are suggested to be approximately 14 ft. in diameter by 24 ft. long. The volume of each such cylinder would be 3,700 cu. ft. One of these cylinders would house a crew of six to eight astronauts. The disadvantage of the current clustered module designs is that the total area is linear and there is no central enclosure, resulting in segmented crowded habitable areas.

The present invention provides a central enclosed habitable area for various uses. In accordance with the present invention, 24 modules approximately 15 ft. by 15 ft. by 60 ft. long would provide an outer area (total module area) of 324,000 cu.ft., and a central enclosure of 216,000 cu. ft. The present invention would provide total usable area of 540,000 cu. ft. whereas the equivalent number of modules of the prior art and currently proposed space stations would provide only 177,600 cu. ft. with no central enclosure.

There are several patents which disclose space modules capable of forming various space station configurations, most of which consist of a ring-like shape having a central hub. Others provide various modules to serve as the core of the station structure.

Hogan, U.S. Pat. No. 4,057,207 discloses a module having the geometry of joined truncated icosohedra, which when a plurality of them are joined together, form a space vehicle. The vehicle formed would consist of two types of rings or four varieties of helices. The helical configuration would allow simple gravity to be generated by way of rotation and also serve as a habitable framework about which a large cylindrical space structure could be built. Hogan teaches joining the modules more or less end-to-end in a linear manner. The actual usable space in such configurations is limited to a relatively long and narrow tube.

Schneider et al, U.S. Pat. No. 4,579,302 discloses a shuttle-launch triangular space station deployable in earth orbit. The framework is comprised of three trusses having generally planar faces comprised of foldable struts which expand and lock into structural engagement forming a repetition of equilateral triangles and non-folding struts interconnecting the two faces. Cylindrical modules may be secured to the three apexes of the framework and connected together by tunnels. The modules may be used for habitat, logistics, service, and laboratory.

Berglund, U.S. Pat. No. 3,169,725 discloses a compact folded space station which is collapsed and transported in the payload bay of a launch vehicle. The station utilizes rigid cylindrical sections, equipped for life support and experiments before launch, joined together by flexible connectors. These sections are connected to a central hub and are erectable to form a rigid hexagonal, tubular ring thereabout in earth orbit. The sections are connected to the hub by spoke-like telescoping struts and may also be interconnected by inflatable access tubes.

Nesheim, U.S. Pat. No. 3,332,640 discloses a preassembled space station comprising tubular sections pivotally connected end to end to form a ring-like structure.

Berce, et al, U.S. Pat. No. 3,792,558 is not a space station, but rather a transportable, ground supported dwelling structure which requires a rigid parallelopedic mounting frame structure having longitudinal, transverse, and vertical beam-like structural members. The frame structure serves as the shipping container, or "transcontainer" for rectangular "hull" members and as the base framework onto which the room-like "hulls" are mounted to form a dwelling. The modular hulls require a rectangular flange around all the edges to enable their fixing onto the framework.

The present invention is distinguished over the prior art in general, and these patents in particular by a modular space station having a central enclosed area which is erected in earth orbit from modules transported by a reusable space shuttle or an expendable rocket. The modules have panels which extend outwardly to join the modules together in spaced relation to form a complete enclosure about a common interior volume with the panels and modules forming the walls of the common enclosure. When two modules are so joined a single space station unit is created with a common central area having approximately the same volume as the modules. The single space station units serve as building blocks which may be joined in various configurations to create increasingly larger space station units having a plurality of enclosed central areas. The modules and central areas created thereby serve as usable space for various purposes and capable of being equipped to support life. Passageways allow occupant communication between the modules and the central enclosure. Adapter modules may be secured to the modules and various other devices such as docking ports for docking space craft to the station and thrust generating or communication devices.

SUMMARY OF THE INVENTION

It is therefore an object of the present invention to provide a modular space station structure having a central enclosed area and erected in earth orbit from modules transported in the payload bay of a space shuttle.

It is another object of this invention to provide a modular space station structure having extendible panels which are joined to create a common central enclosed area between at least two habitable modules.

Another object of this invention is to provide an efficient method of creating enclosed space stations utilizing habitable modules as the building blocks forming the enclosure.

Another object of this invention is to provide a method of constructing a modular space station in earth orbit to produce maximum habitable area with a minimum amount of material and construction.

Another object of this invention is to provide a method of constructing a modular space station in earth orbit to produce a large usable area capable of supporting colonies of human inhabitants.

A further object of this invention is to provide a modular space station unit capable of being repetitively joined with similar modular space station units to provide increasingly larger space stations.

A still further object of this invention is to provide a modular space station structure which is economical to manufacture and may erected easily and quickly in earth orbit.

Other objects of the invention will become apparent from time to time throughout the specification and claims as hereinafter related.

The above noted objects and other objects of the invention are accomplished by a modular space station having a central enclosed area which is erected in earth orbit from modules transported by a reusable space shuttle or an expendable rocket. The modules have panels which extend outwardly to join the modules together in spaced relation to form a complete enclosure about a common interior volume with the panels and modules forming the walls of the common enclosure. When two modules are so joined a single space station unit is created with a common central area having approximately the same volume as the modules. The single space station units serve as building blocks which may be joined in various configurations to create increasingly larger space station units having a plurality of enclosed central areas. The modules and central areas created thereby serve as usable space for various purposes and capable of being equipped to support life. Passageways allow occupant communication between the modules and the central enclosure. Adapter modules may be secured to the modules and various other devices such as docking ports for docking space craft to the station and thrust generating or communication devices.

DESCRIPTION OF THE PREFERRED EMBODIMENT

Figure 1:
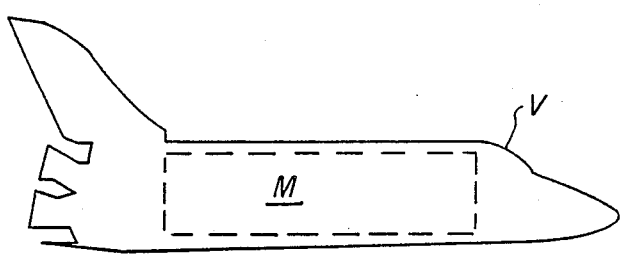
FIG. 1 is a side elevation of a space shuttle having a space station module contained within the payload bay.
Figure 2:
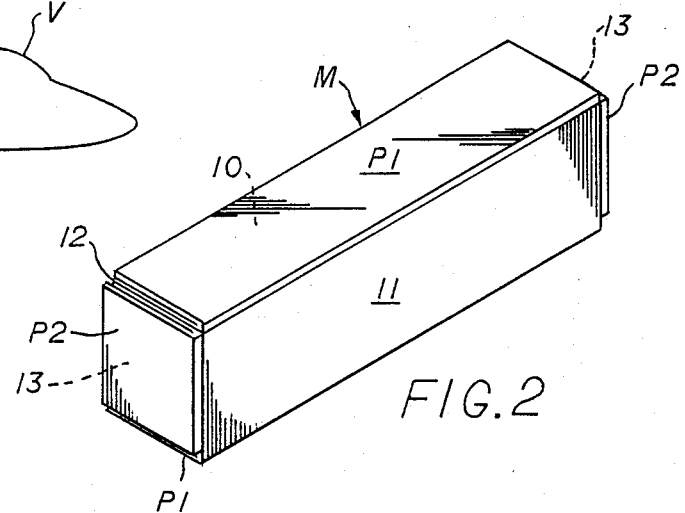
FIG. 2 is an isometric view of a space station module having extendible panels for use in constructing a space station in accordance with the present invention.
Figure 3:
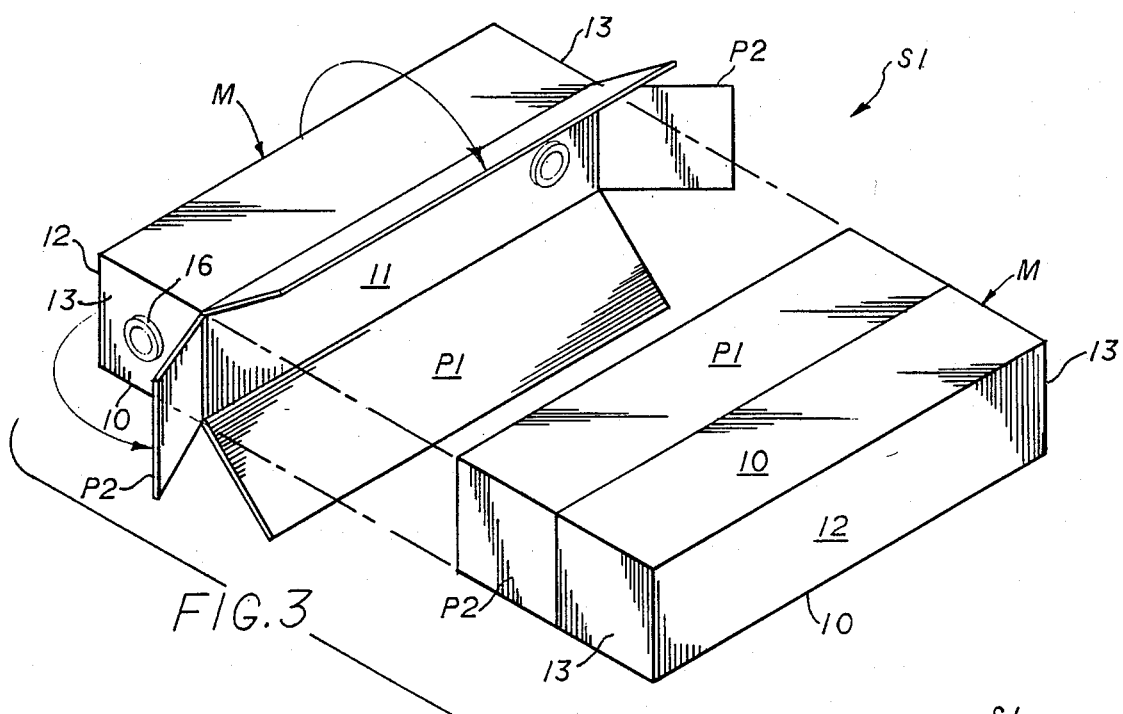
FIG. 3 is an isometric view of a pair of spaced modules prior to being joined and showing the panels being extended.

Referring to the drawings by numerals of reference, there is shown in FIG. 1, a space shuttle V having one or more modules M transported in its payload bay. The modules are of a size and shape to substantiallY follow the geometry of the payload interior. Currently, the payload bay area of space shuttles is approximately 60 ft. long by 15 ft. wide and 15 ft. in height, with the top or bay doors following an arcuate contour. The modules may also be transported individually as the payload on expendable rockets.

Ideally, as shown in FIGS. 2-5, a preferred module M comprises a hollow rectangular member having opposed top and bottom walls 10, opposed front and rear walls 11 and 12, and opposed end walls 13. The walls 10-13 form an enclosed rectangular structure. For ease of understanding, the dimensions of the structure would be slightly less than the payload bay interior to facilitate installation and removal, but for purposes of illustration and example, the dimensions will be referred to as approximately 60 ft. long by 15 ft. wide and 15 ft. in height. A single module would provide approximately 13,500 cu. ft. of usable enclosed space.

A pair of rectangular panels P1 are hingedly joined to the longitudinal edges of the front wall 11 and are stored in a folded position against the top and bottom walls 10 of the module M. Another set of generally square end panels P2 are hingedly joined to the side edges of the front wall 11 and are stored in a folded position against the end walls 13 of the module M.

Each single module M may be independently pressurized to serve as a small space station until two or more have been deployed from the payload bay of the transport vehicle. When at least two modules have been deployed, they may be joined by positioning them generally parallel and folding or pivoting the panels P1 and P2 on each of the modules to be joined outwardly to a position perpendicular to the front wall 11 of the modules M. The outward edges of the laterally opposed panels are joined together end to end and the seams between the panels sealed by conventional methods. For example, the edges of the panels may be butted together and the seam of the butt joint and the corner seams between the panels sealed with epoxy material and overlapped on the interior and exterior surfaces by a strip 14 of suitable fabric or metallic reinforcing material to form an airtight seal. Airtight seals may also be installed between the mating surfaces when adjoining the panels. The panels may also be joined by other methods conventional in the art, such as by clamping, bolting, magnetism, or tongue and grooves.

The panels P1 and P2, when properly joined and sealed, provide a large enclosed common area 15 between the modules which may also pressurized to provide additional usable space. The enclosed area thus created provides an additional 27,000 cubic feet of usable space. With only two shuttle flights, it is possible provide an enclosed space station S1 (FIG. 4) having a total usable area of 54,000 cubic feet.

Figure 5:
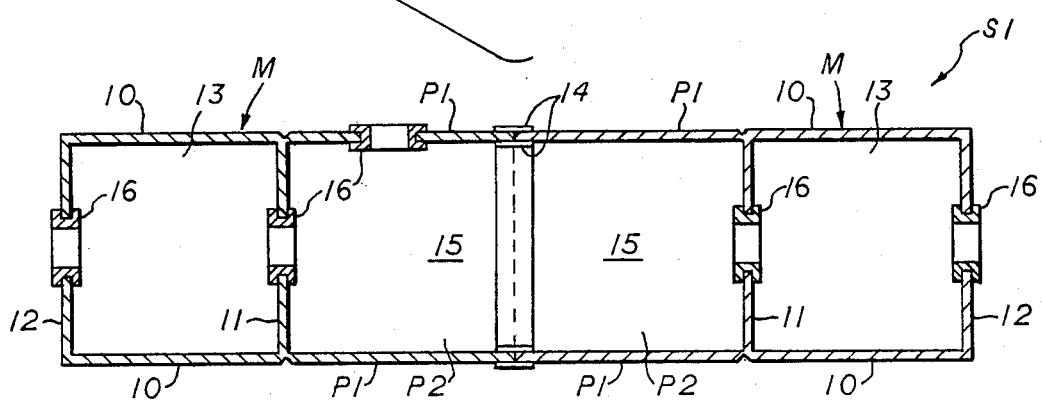
FIG. 5 is a cross section view of the single space station unit of FIG. 4 taken along line 5—5.
Figure 4:
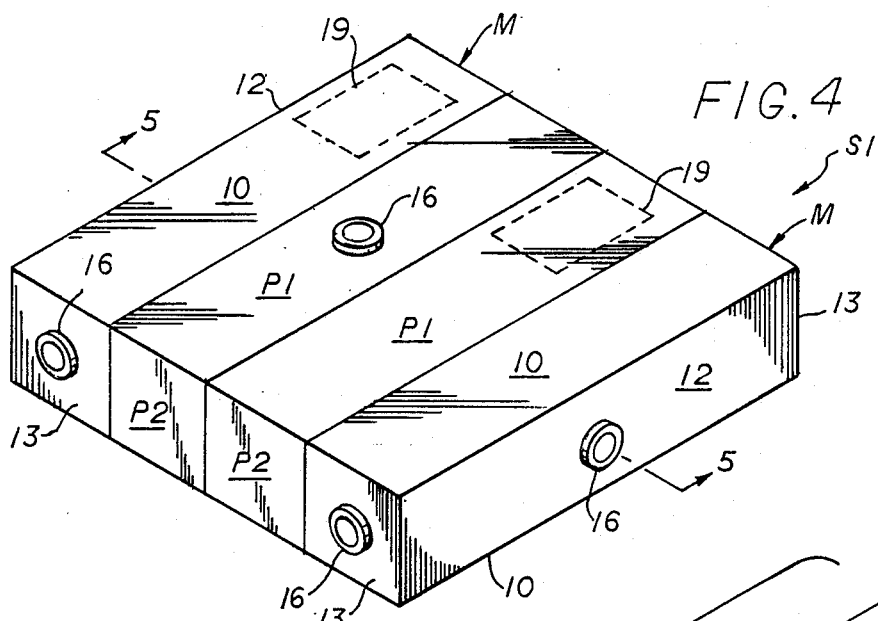
FIG. 4 is an isometric view of a pair of modules with the panels extended and joined together to form a single space station unit.

As shown in FIGS. 4 and 5, hatches or passageways 16 may be installed through the walls 10-13 of the modules M and/or the panels P1, P2 to allow occupants to travel between the modules and/or between the individual modules and the central enclosure 15. The passageways 16 are preferably in the form of an airlock so that communication between selective modules and the central enclosure 15 may be closed during construction or in the event that a pressure leak should develop.

Each individual module may be self sufficient to support life and provide living quarters as more modules are added with subsequent shuttle flights. Also various modules may be equipped for a special purpose, such as living quarters, mechanical, life support system, food supply or storage, etc. After one modular space station unit S1 has been formed then other modules may be added to the structure, or several space station units S1 joined together to form larger modular structures.

Figure 6:
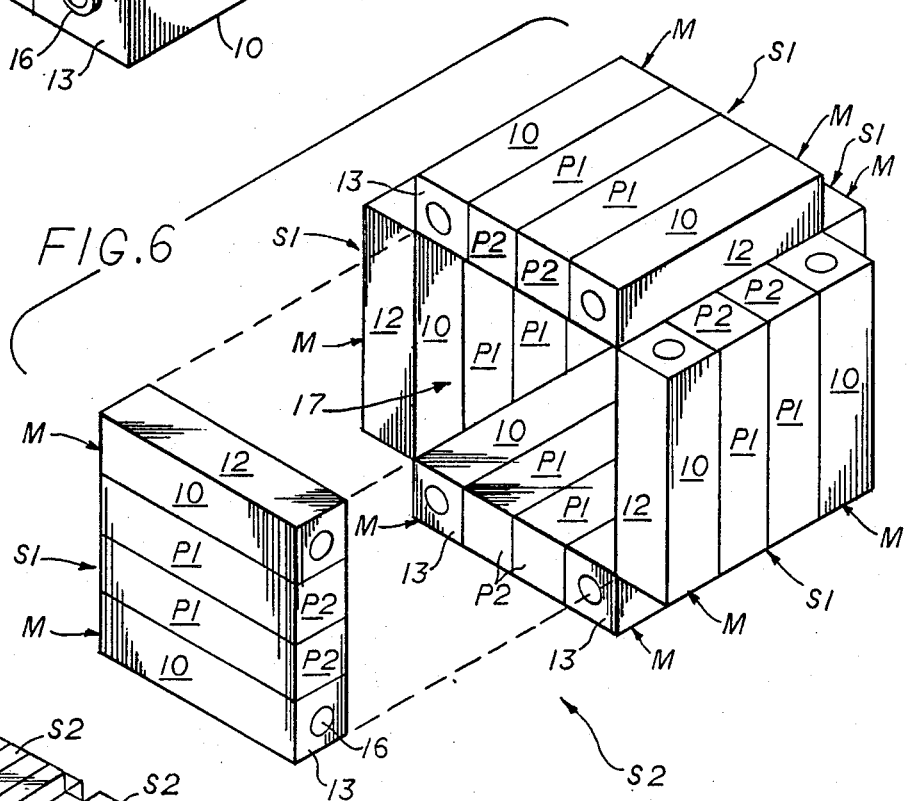
FIG. 6 is an isometric view of a larger space station unit formed by joining a plurality of single space station units of FIG. 4 together create a central common enclosed area.

FIG. 6 shows a cube shaped space station S2 created by joining six of the space station units S1 formed by assembled modules M of the type previously described with
reference to FIGS. 1-5. The space stations S1 utilizing the assembled modules M are joined together along adjacent edges to form the side walls of the larger space station unit S2 and so joined, create another large enclosed common interior area 17.

With the embodiment of FIG. 6, six space station units S1 each with two modules M per side (having an enclosed volume of approximately 54,000 cu. ft) would provide an outer volume of 324,000 cu. ft., and a central enclosure of 216,000 cu. ft. resulting in total usable volume of 540,000 cu. ft. whereas the equivalent number of cylindrical modules of the prior art wheel and clustered module space stations (assumed to be 60 ft. long by 15 ft. in diameter) would provide only 254,400 cu. ft. with no central enclosure.

Figure 7:
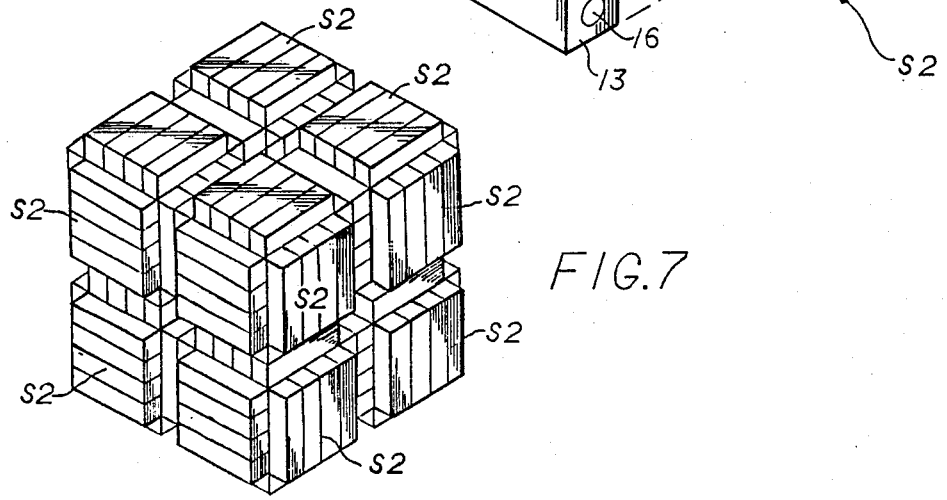
FIG. 7 is an isometric view of the larger space station units of FIG. 6 joined together to form a subsequent space station unit having a plurality of enclosed areas.

After one larger space station unit S2 has been formed (FIG. 6) then other modules may be added to the structure, or several of the larger space station units S2 joined together to form even larger modular structures. For example, FIG. 7 illustrates a giant cubic space station S3 formed by joining eight of the previously described cube shaped space station units S2. The cube shaped space stations S3 could also be spaced apart to form the corners of an even larger cube which would be enclosed by panels in the manner previously described.

The space station S3 depicted in FIG. 7, would provide eight sub-enclosures each having a module volume of 324,000 cu. ft., a central enclosure of 216,000 cu. ft., and total usable volume of 540,000 cu. ft. The resulting large space station would thus provide a total module volume of 2,592,000 cu. ft., and total enclosure area 4,320,000 cu. ft. This usable area would be contained within a cube shaped space station approximately 180 ft. square.

Figure 8:
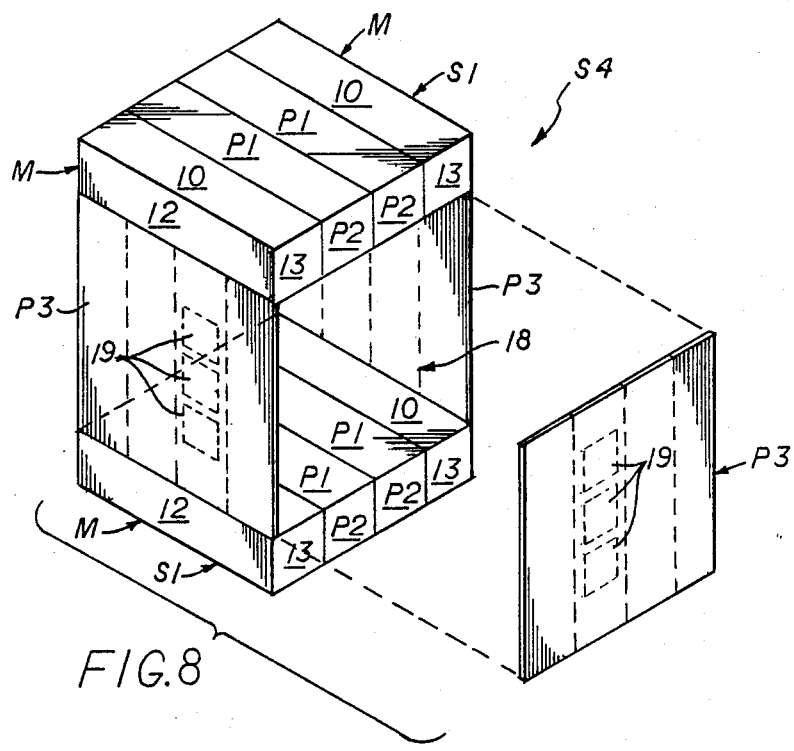
FIG. 8 is an isometric view of a pair of the single space station units of FIG. 4 joined by panels to form a larger space station unit having a central common enclosed area.

FIG. 8 shows a space station S4 created by two stations S1 utilizing the modules M of the type previously described with reference to FIGS. 1-5 placed in spaced apart parallel relation and connected together by a plurality of panels P3 joined to the opposed outer edges of modules M to extend between the spaced modules to form a cube-shaped space station S4 having an enclosed common interior area 18. A station of the type depicted in FIG. 8 would provide a total module volume of 108,000 cu. ft. and a central enclosed volume of 216,000 cu. ft. for a total of 324,000 cu. ft. of usable enclosed space.

The panels P3 used in the construction of the space station S4 preferably coincide with the dimensions of the basic module M and comprise a folded panel 60 ft. long in sections approximately 15 ft. wide which unfold to lock into a rigid panel approximately 60 ft. by 60 ft. square. The surface of the panels P3, or the panels of the modules M, may also contain energy gathering cells 19 such as solar cells, or be comprised of radiation or heat deflecting materials to capture the vast energy available in outer space for use inside the space station or which may be converted inside the space station to a form suitable for sending to the earth. Obviously, the space station versions utilizing panels can be constructed very quickly and provide a very large central enclosure with as few as two or three shuttle trips.

Figure 9:
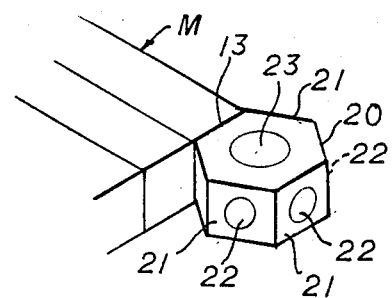
FIG. 9 is a partial isometric view of a module having a docking module connected thereto.

The exterior surfaces of the previously described modules M may be also be provided with a berthing or docking port for self propelled vehicles. As shown in FIG. 9, adapter modules 20 having one or more side walls may be secured to the modules M for various purposes. The adapter modules 20 have outwardly angular side walls 21 constructed to provide berthing or docking ports 22 for docking space craft to the modules or modular space stations. The exterior surface of the adapter modules 20 may also serve as the means by which thrust generating, communication and energy gathering devices 23 may be affixed to a convenient location on an individual module or a space station assembly.

Figure 10:
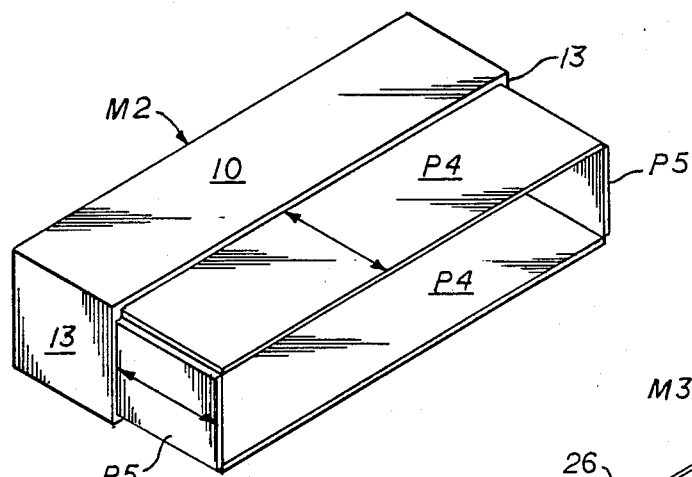
FIG. 10 is an isometric view of a space station module having modified extendible panels.

FIG. 10 illustrates a modification of the basic rectangular module M2 wherein panels P4 and P5 are slidably received inside, outside or within the top, bottom and end walls of the module (shown within). When the module M2 is to be joined with another, the panels P4 and P5 may be extended outward from the module by means conventional in the art, such manually, hydraulically, or electrically, and joined together with the panels of a second module in the manner previously described.

Figure 11:
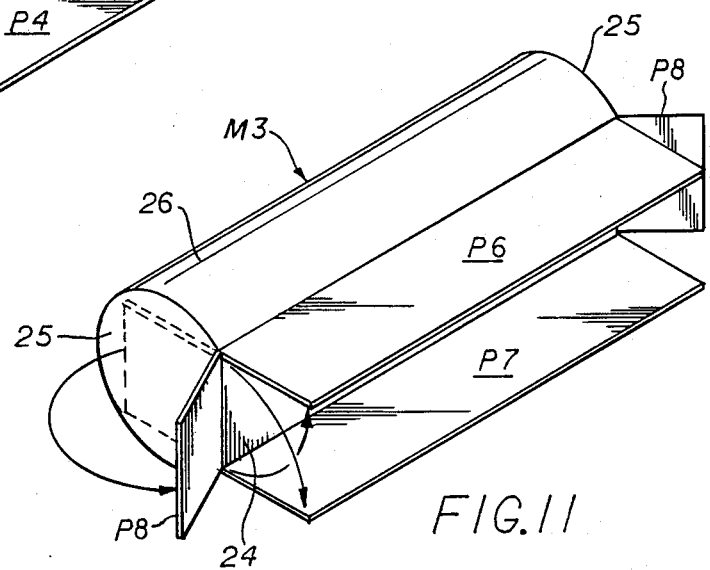
FIG. 11 is an isometric view of a space station module having a modified rectangular configuration.

FIG. 11 shows another modification of the rectangular module which more closely follows the contour of the space shuttle payload bay. The module M3 comprises a hollow rectangular member having a rectangular front wall 24, opposed end walls 25, and an outwardly curved side wall 26. As previously described, the dimensions would be slightly less than the payload bay interior. Such a module would be approximately 60 ft. long and 15 ft. in diameter, and with the panels unfolded would have a volume of approximately 12,050 cu. ft.

Flat rectangular panels P6 and P7 are hingedly joined to the longitudinal edges of the front wall 24 and are stored in an overlapped folded position against the front wall 24. Another set of generally square end panels P8 are hingedly joined to the side edges of the front wall 24 and are stored in a folded position against the end walls 25. When the panels P6, P7, and P8 are folded outward and joined with the panels of another module they create a large enclosed common area between the modules which may also pressurized to provide additional usable space. The enclosed area thus created provides an additional 27,000 cubic feet of usable space. With only two shuttle flights, it is possible to provide an enclosed space station having a total usable volume of 51,100 cu. ft.

By enclosing a central common area, the present invention is a highly efficient and utilitarian use of modular construction not provided in other modular space station systems such as wheel-like structures and "clustered module" aggregations and conglomerations which have a central open frame structure with various cylindrical modules spaced apart thereon and connected together by a network of pressurized tubes. The efficient use of space is diminished in these systems due to the fact that the total usable area is linear, resulting in crowded habitable quarters, and there is no common central enclosure.

It should be obvious from the foregoing description that the modular construction as herein described will provide the maximum amount of usable space with a minimum amount of materials and labor. One of the major features of the present space station structure is that the hollow modules each contain usuable space, and they additionally serve as building blocks to be joined in a predetermined pattern to form a complete enclosure about a common area. This feature makes it possible to create the maximum amount of usable space with the minimum amount of materials and the least number of trips into space.

While this invention has been described fully and completely with special emphasis upon several preferred embodiments, it should be understood that within the scope of the appended claims the invention may be practiced otherwise than as specifically described herein.

I claim:

1. A space station structure assembled in orbit comprising:

a plurality of hollow modules transported into orbit by rocket and joined in spaced relation by panels extending therebetween to form a complete enclosure about a common interior volume, said panels and modules forming the walls of the common enclosure, said modules forming end walls of the common enclosure and said panels forming adjacent mating side walls of the common enclosure to create a single space station unit having a central area between the joined modules the volume of which approximates or exceeds the sum of the combined volumes of said joined modules.

2. A space station structure according to claim 1 in which
said modules are transported into orbit in the payload bay of a space shuttle.

3. A space station structure according to claim 1 in which
said modules are joined in generally parallel relation by said panels.

4. A space station structure according to claim 1 in which
two of said modules are joined in generally parallel spaced relation by said panels and form end walls of the common enclosure and said panels extending therebetween form four exterior side walls of the common enclosure to create a single space station unit having a central area between two modules,
said central area having a volume which approximates or exceeds the sum of the combined volumes of said joined modules.

5. A space station structure according to claim 4 in which
a plurality of said single space station units are joined together in a predetermined pattern to form a complete enclosure about a common interior volume to create a larger second space station unit having a plurality of enclosed central interior volumes.

6. A space station structure according to claim 5 in which
said single space station units form the exterior walls of the common interior volume.

7. A space station structure according to claim 6 in which
six of said single space station units form the exterior walls of the common interior volume to form a generally cubic second larger space station unit.

8. A space station structure according to claim 5 in which
two of said single space station units are joined in generally parallel spaced relation by panels extending therebetween and form two exterior walls of the common enclosure and said panels extending therebetween form four exterior walls of the common enclosure of said larger second space station unit.

9. A space station structure according to claim 5 in which
a plurality of said larger second space station units are joined together in a predetermined pattern to create a third larger space station unit having a plurality of enclosed central interior volumes.

10. A space station structure according to claim 1 in which
said modules have passageways in their surfaces sealed for selective communication with other modules.

11. A space station structure according to claim 1 in which
said modules have passageways incorporated into their surfaces facing said enclosed central interior volume and sealed for selective communication with said central interior volume.

12. A space station structure according to claim 1 including
sealing means installed between mating surfaces of said modules and said panels forming an airtight seal about the enclosed central interior volume.

13. A space station structure according to claim 1 in which
exterior surfaces of certain ones of said plurality of modules include a docking port for connecting self propelled vehicles to the enclosure.

14. A space station structure according to claim 1 further including
adapter modules secured to certain ones of said modules and having docking ports for connecting space craft to the enclosure.

15. A space station structure according to claim 1 further comprising
adapter modules secured to certain ones of said modules and having thrust generating means for propelling said enclosure.

16. A space station structure according to claim 1 further comprising
adapter modules secured to certain ones of said modules and having communication means for transfering information between said enclosure and another point.

17. A space station structure according to claim 1 further comprising
adapter modules secured to certain ones of said modules and having energy gathering means for gathering energy present in the enclosure environment.

18. A space station structure according to claim 1 in which
said modules comprise enclosed hollow polygonal members having movable panels extendible therefrom.

19. A space station structure according to claim 1 in which
said modules comprise enclosed hollow generally rectangular members having movable panels extendible therefrom.

20. A space station structure according to claim 1 in which
said modules comprise enclosed hollow rectangular members having at least one outwardly convex arcuate side wall and one flat wall with movable panels extendible therefrom.

21. A method of creating a habitable enclosure in outer space comprising the steps of:
constructing a series of hollow modules on the earth's surface,
transporting said modules by rocket into earth orbit,
deploying said modules in earth orbit, and
extending panels between certain said modules to join them in spaced relation to form a complete enclosure about a common interior volume, said panels and modules forming the walls of the common enclosure.

22. A method according to claim 21 in which
said modules are constructed in a geometry closely following the interior of the payload bay of a space shuttle,
said modules are transported in a space shuttle into earth orbit,
said modules are deployed from the payload bay of said shuttle in earth orbit, and
said panels are extended from said modules to be joined together with the panels of other modules to enclose said common interior volume.

23. A method according to claim 21 in which
said modules are joined in generally parallel relation by said panels.

24. A method according to claim 21 including the steps of
placing two of said modules in generally parallel spaced relation, and
extending the panels therebetween whereby said modules and said panels form the exterior walls of the common enclosure to create a single space station unit having a central area between two modules which has approximately the same volume as said modules.

25. A method according to claim 24 including the step of
joining a plurality of said single space station units together in a predetermined pattern to form a complete enclosure about a common interior volume to create a larger second space station unit having a plurality of enclosed central interior volumes.

26. A method according to claim 24 including the steps of
joining one or more subsequent said single space station units in a predetermined pattern to form subsequent larger space station units having enclosed central interior volumes.

27. A method according to claim 24 in which
said single space station units form the exterior walls of the common interior volume.

28. A method according to claim 27 in which
six of said single space station units form the exterior walls of the common interior volume to form a generally cubic subsequent larger space station unit.

29. A method according to claim 24, including the step of
joining said subsequent larger space station units together to form increasingly larger space station units having a plurality of enclosed central interior volumes.

30. A method according to claim 24 including the step of
placing two said single space station units in generally parallel spaced relation, and
extending panels therebetween whereby said single space station units and said panels form exterior walls of the common enclosure of said subsequent larger space station unit.

31. A method according to claim 21 including the step of
providing the exterior surfaces of certain ones of said plurality of modules with a docking port for connecting self propelled vehicles to the enclosure.

32. A method according to claim 21 including the step of
securing adapter modules provided with docking ports to certain ones of said plurality of modules for connecting space craft to said enclosure.

33. A method according to claim 21 including the step of securing adapter modules having thrust generating means to certain ones of said modules for propelling said enclosure.

34. A method according to claim 21 including the step of
securing adapter modules having communication means to certain ones of said modules for transferring information between said enclosure and another point.

35. A method according to claim 21 including the step of
securing adapter modules having energy gathering means to certain ones of said modules for gathering energy present in the enclosure environment.

36. A method according to claim 21 including the step of
installing pressure-tight passageways into the surfaces of said modules.

* * * * *